United States Patent [19]

Lunt

[11] Patent Number: 4,752,351

[45] Date of Patent: Jun. 21, 1988

[54] AUTOMATED VELCRO FEED AND CUT ASSEMBLY FOR ULTRASONIC WELDING APPLICATIONS

[76] Inventor: Audrey T. Lunt, 6371 Vermont Hill Rd., South Wales, N.Y. 14139

[21] Appl. No.: 88,721

[22] Filed: Aug. 24, 1987

[51] Int. Cl.⁴ .............................................. B29C 65/08
[52] U.S. Cl. ................................ 156/580.1; 156/73.3; 156/261; 156/518; 228/1.1
[58] Field of Search ...................... 156/73.1, 73.3, 261, 156/518, 520, 580.1, 580.2; 228/1.1

[56] References Cited

U.S. PATENT DOCUMENTS

| | | | |
|---|---|---|---|
| 2,157,556 | 5/1939 | Menschner | 156/261 |
| 3,168,430 | 2/1965 | Almasi | 156/520 |
| 3,823,055 | 7/1974 | Schulz et al. | 228/1.1 |
| 3,857,346 | 12/1974 | Dal Negro | 156/580.1 |
| 4,220,493 | 9/1980 | Wehr et al. | 156/518 |
| 4,552,600 | 11/1985 | Laiewski et al. | 156/580.1 |

Primary Examiner—Michael Wityshyn
Attorney, Agent, or Firm—Michael Ebert

[57] ABSTRACT

A motorless Velcro tape feed and cut assembly acting as a slave unit which cooperates with the horn of an ultrasonic welding machine. When the horn is brought down to carry out a welding action, it then depresses the spring-biased operating block of the assembly, causing it to shift downwardly from its normally raised position above a base plate to a final position adjacent to the base plate, the block returning to its raised position when the horn is retracted. Anchored on the base plate and projecting thereabove is an anvil which telescopes within an open-ended anvil channel in the block, the length of the anvil being such that in the final position of the block its head is then in operative relation to the horn to effect welding of a Velcro component onto a fabric lying on the upper face of the block. Disposed within the block is a Velcro tape feed roller that is driven in response to block movement as the block returns to its raised position, the rotating roller then advancing the leading end of the tape through the eye of a cutting block into the anvil channel to occupy a position therein above the anvil head. When in the course of a welding machine cycle the horn is brought down to depress the block, this action causes the leading end of the tape to be severed to form a Velcro component that is then pressed by the anvil head against the fabric, the Velcro component then being welded to the fabric by the horn.

7 Claims, 4 Drawing Sheets

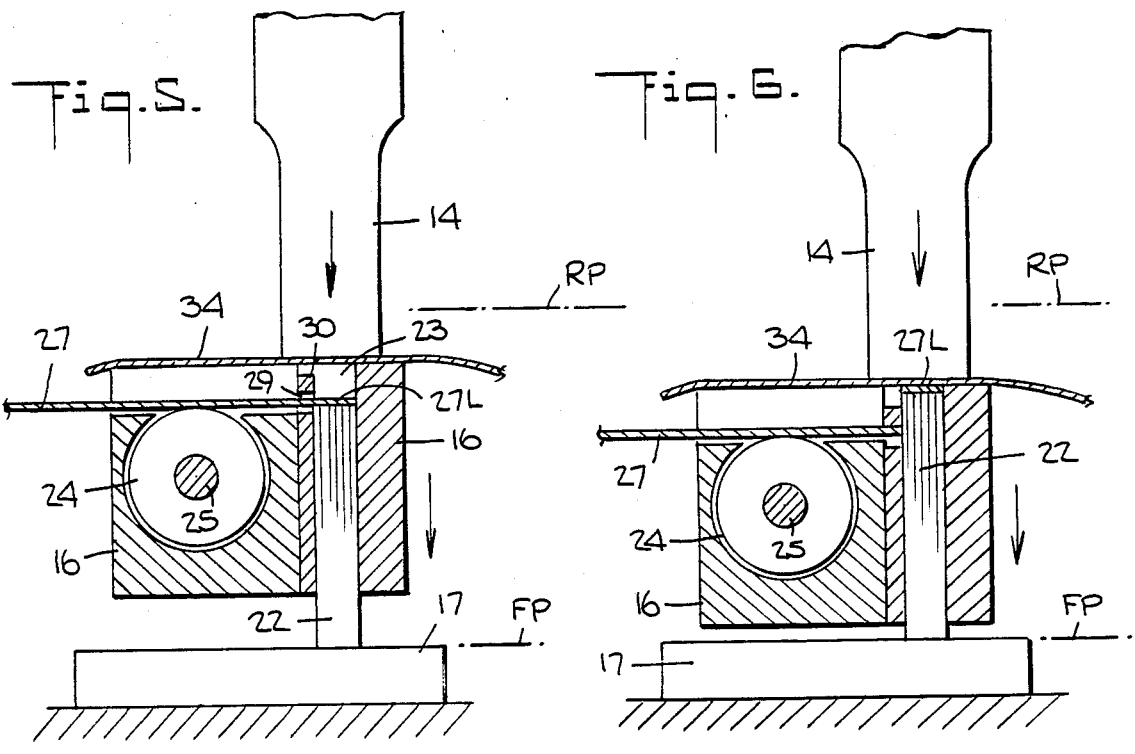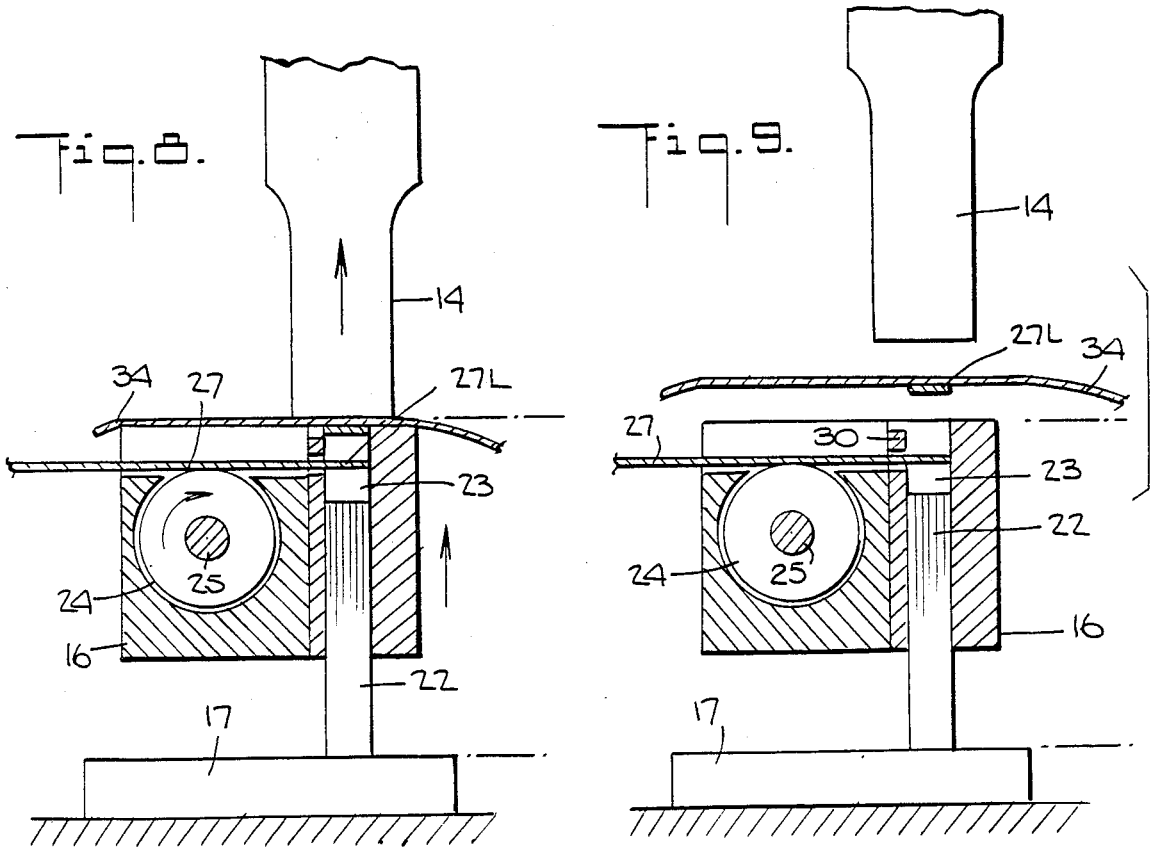

AUTOMATED VELCRO FEED AND CUT ASSEMBLY FOR ULTRASONIC WELDING APPLICATIONS

BACKGROUND OF INVENTION

1. Field of Invention

This invention relates generally to the ultrasonic welding of Velcro tape components to a fabric, and more particularly to a motorless Velcro tape feed and cut assembly which acts as a slave unit with respect to an ultrasonic welding machine and cooperates with the reciprocating horn thereof, whereby the up and down movement of the horn causes the assembly to feed the leading end of a Velcro tape into an anvil channel and to sever this end from the tape to form a Velcro component that is then welded to a fabric.

2. The Prior Art

It is known to use in place of buttons, zippers and other conventional types of fasteners, releasable "Velcro" fasteners which serve to hold together fabric panels or other complementary pieces. A Velcro fastener is constituted by a male or hook component created by a uniform array of stiff hooks and a female or loop component whose surface is constituted by a pile of tiny soft loops. When the male and female components are pressed together, the hooks become embedded in the loops and are held thereby until the components are peeled apart.

Velcro fasteners are snug, jam proof and washable. The components thereof are available in tape form which can be cut to a desired size. The male hook component, usually fabricated of nylon, is woven in the form of raised loops which are heated to retain their shape, the loops being then clipped to form the desired hooks. The loop or female component is also fabricated of nylon, use being made of a ground tape interwoven with a dense multiplicity of yarns to form a pile surface that is then napped to create a continuous mass of uncut loops designed to couple with the male hooks.

As disclosed in my prior U.S. Pat. No. 4,382,303, it is known to produce garments whose closures are constituted by Velcro fastener components that are ultrasonically welded to fabric panels. Ultrasonic welding may be used to weld together two or more pieces or sheets of thermoplastic material. This is accomplished by interposing the sheets between a "sonotrode" horn and an anvil. The horn is excited into vibration at an ultrasonic frequency and the ultrasonic energy is tranformed into heat which softens the thermoplastic sheets and causes them to fuse together. The amount of heat generated is controlled by the adjustable amplitude of ultrasonic vibration.

While machines are known capable of dispensing or die cutting pieces of Velcro tape in a predetermined size appropriate to a fastener for a particular fabric application, it has not heretofore been possible to automate the ultrasonic welding operation. Thus, in a typical welding operation such as that necessary to produce Velcro fasteners for garments of the type disclosed in my above-identified patent, an operator must manually place a Velcro component over a sheet of fabric material at an appropriate position thereon, and then operate an ultrasonic welding machine to weld the component to the sheet.

This hand operation is time consuming and subject to human error, as a consequence of which the cost of producing garments having Velcro fasteners is relatively high. Where the garments are intended to be of the disposable type and make use of inexpensive non-woven fabrics, the costs incurred by conventional ultrasonic welding operations for the Velcro fasteners raises the production cost of the garment to a level approaching a point that is not acceptable in disposables.

SUMMARY OF INVENTION

In view of the foregoing, the main object of this invention is to provide a motorless Velcro tape feed and cut assembly adapted to cooperate with the horn of an ultrasonic welding machine whereby the up and down movement of the horn causes the assembly to feed the leading end of a Velcro tape into an anvil channel and to cut this end from the tape and to form a Velcro component that is welded to a fabric.

More specifically, an object of this invention is to provide an assembly of the above type in which the feed roller which advances the leading end of the Velcro tape into the anvil channel is operated by a ratchet mechanism that is automatically actuated when the ultrasonic welding horn is retracted from the assembly.

A significant advantage of the invention is that it expedites high speed welding of Velcro components to a fabric; for all an operator need do is to place the fabric on the assembly at a proper position thereon, and then press a switch button which turns on the ultrasonic welding machine to cause its horn to move down to depress the spring-biased block of a Velcro tape feed and cut assembly, the horn then retracting to permit the block to return to its raised position, in the course of which the leading end of a Velcro tape is severed from the tape to form a Velcro component which is then welded to the fabric.

Also an object of the invention is to provide an assembly of the above type which operates efficiently and reliably, and which can be manufactured at relatively low cost.

Briefly stated, these objects are accomplished in a motorless Velcro tape feed and cut assembly acting as a slave unit which cooperates with the horn of an ultrasonic welding machine. When the horn is brought down to carry out a welding action, it then depresses the spring-biased operating block of the assembly, causing it to shift downwardly from its normally raised position above a base plate to a final position adjacent to the base plate, the block returning to its raised position when the horn is retracted. Anchored on the base plate and projecting thereabove is an anvil which telescopes within an open-ended anvil channel in the block, the length of the anvil being such that in the final position of the block its head is then in operative relation to the horn to effect welding of a Velcro component onto a fabric lying on the upper face of the block. Disposed within the block is a Velcro tape feed roller that is driven in response to block movement as the block returns to its raised position, the rotating roller then advancing the leading end of the tape through the eye of a cutting block into the anvil channel to occupy a position therein above the anvil head. When in the course of a welding machine cycle the horn is brought down to depress the block, this action causes the leading end of the tape to be severed to form a Velcro component that is then pressed by the anvil head against the fabric, the Velcro component then being welded to the fabric by the horn.

OUTLINE OF DRAWINGS

For a better understanding of the invention as well as other objects and further features thereof, reference is made to the following detailed description to be read in conjunction with the accompanying drawings, wherein.

Figure 7:
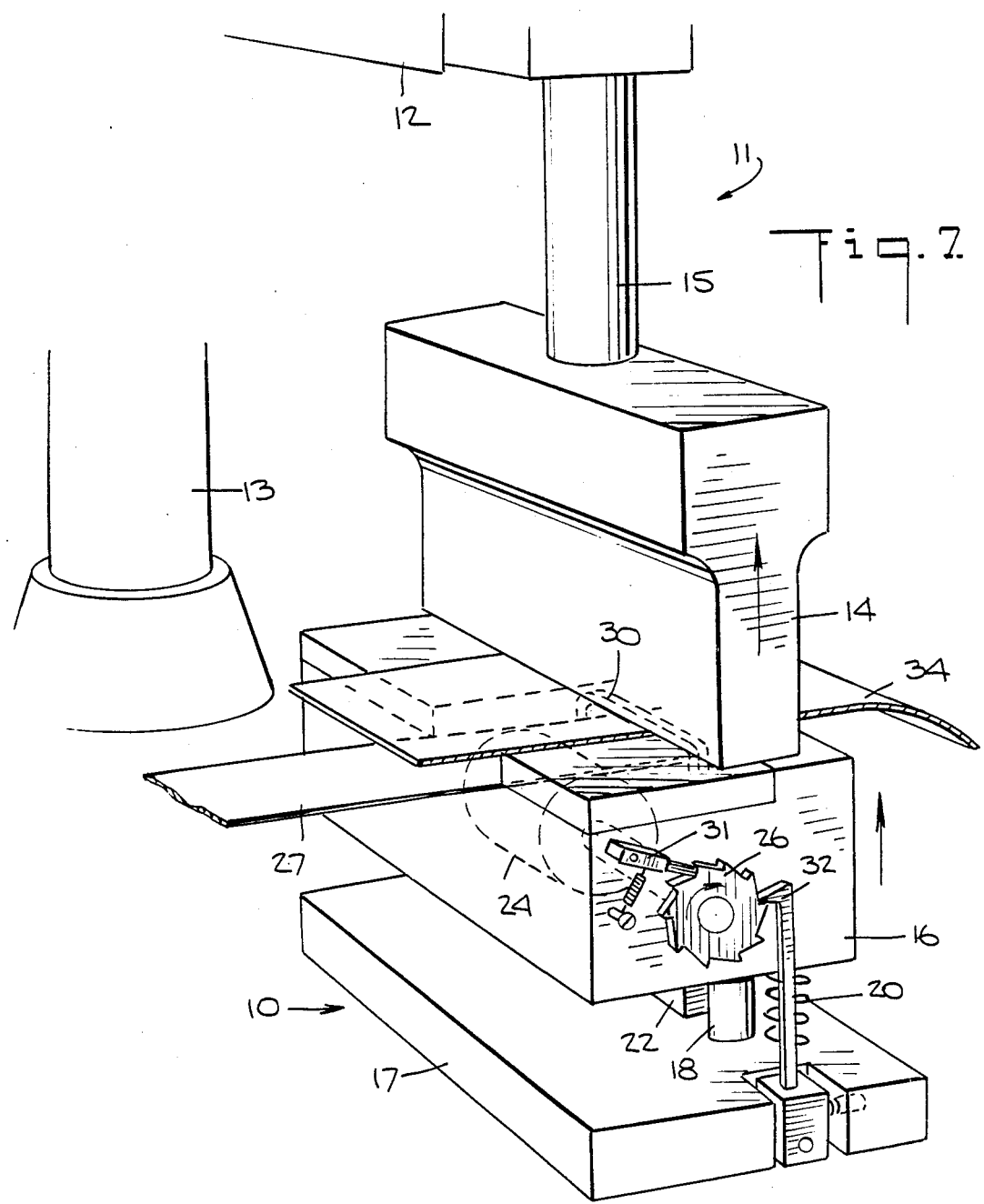
Figure 10:
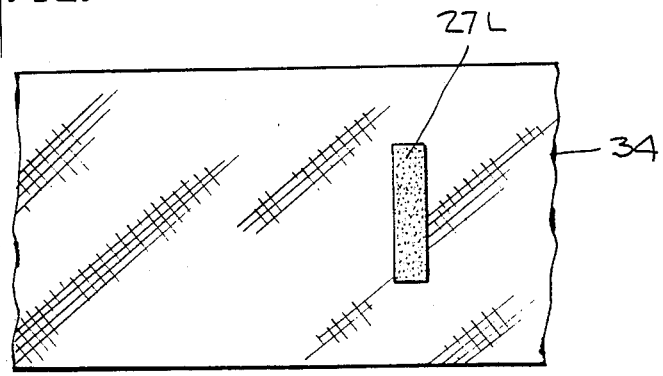

FIG. 5 schematically shows the relationship which exists when the block is at its halfway down position;

FIG. 6 schematically shows the relationship which exists when the block is at its final down position;

FIG. 7 illustrates, in perspective, the ratchet mechanism action which takes place when the horn of the machine proceeds to retract;

FIG. 8 schematically shows how, as a result of this ratchet mechanism action, the feed roller causes the leading end of the tape to enter the anvil chamber;

FIG. 9 schematically shows the relationship which exists when the horn is fully retracted and the block is at its fully raised position; and FIG. 10 shows the fabric with the Velcro component welded thereto.

DESCRIPTION OF INVENTION

The Basic Structure

Figure 1:
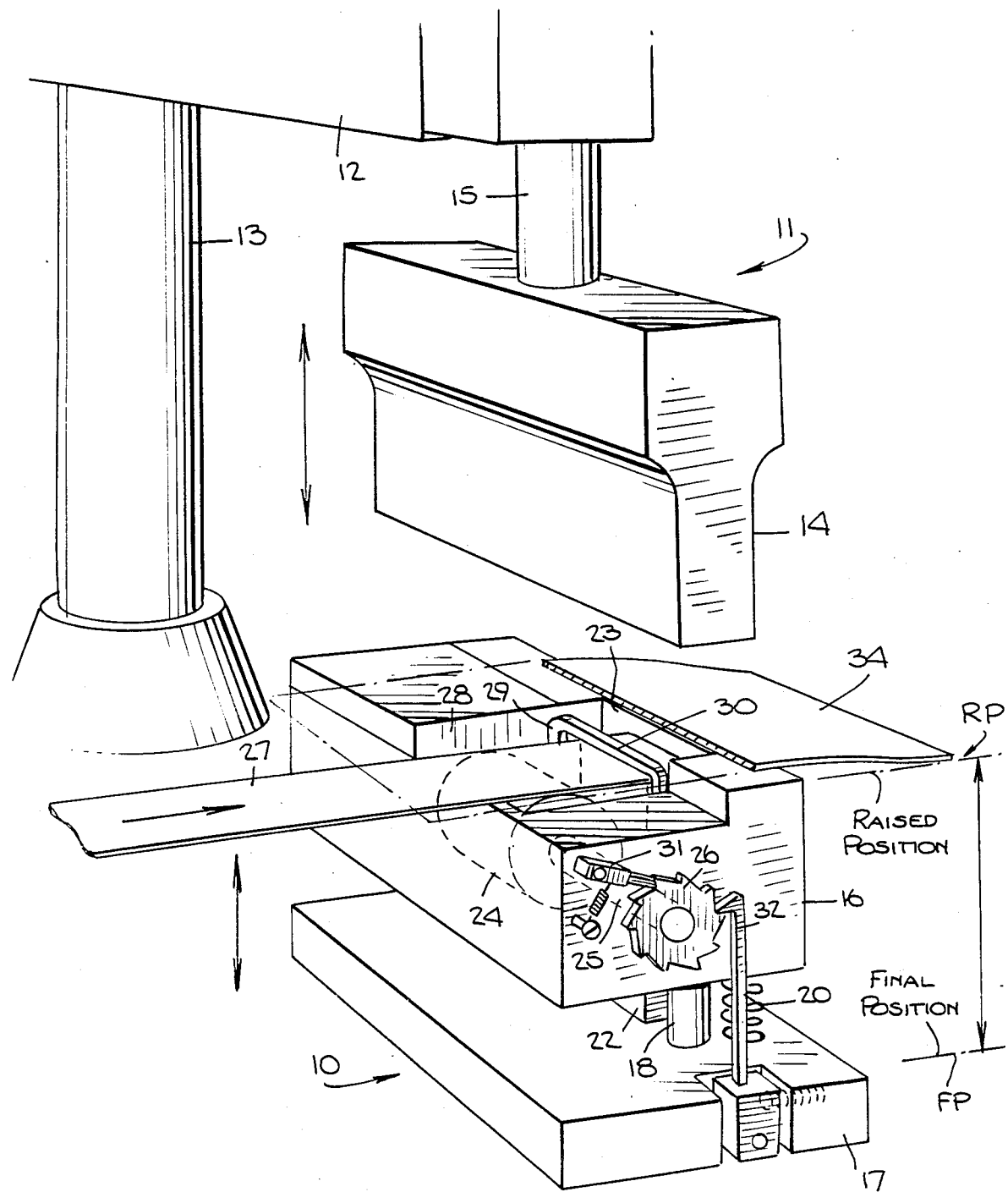
FIG. 1 is a perspective view of a Velcro feed and cut assembly in accordance with the invention which acts as a slave unit that cooperates with the horn of a standard ultrasonic welding machine, the block of the assembly being cut away to expose the mechanism housed therein.
Figure 2:
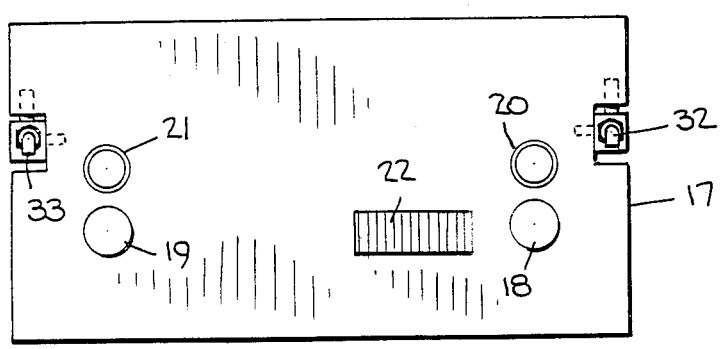
FIG. 2 is a top view of the base plate of the assembly.
Figure 3:
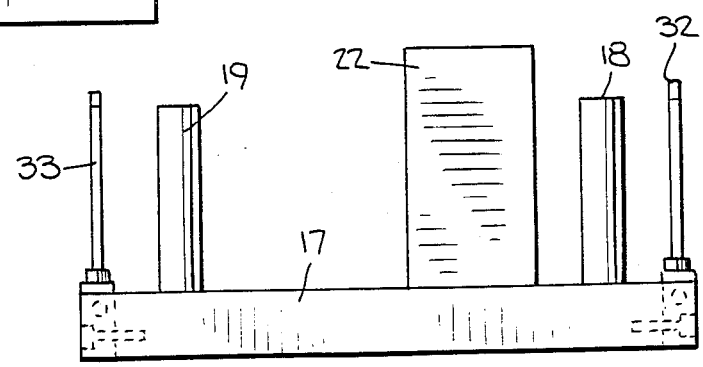
FIG. 3 is an elevation view of the base plate.

Referring now to FIGS. 1 and 2, there is shown a Velcro tape feed and cut assembly in accordance with the invention, generally designated by reference numeral 10. This assembly acts as a slave unit that cooperates with a standard ultrasonic welding machine, generally designated by numeral 11.

Welding machine 11 includes an ultrasonic generator 12 supported at a raised position on a column 13 and an ultrasonic energy horn 14 mounted at the end of a hydraulic piston 15. An operator, by pressing a switch button, activates piston 15 to move horn 14 in the downward direction from its normally retracted position to a fully extended position, and to then return to its retracted position, thereby completing a welding cycle.

Assembly 10 is constituted by a spring-biased operating block 16 which is mounted above a stationary base plate 17 having the same rectangular dimensions. Anchored on base plate 17 are guide posts 18 and 19 which are received in corresponding bores in the block. Behind guide posts 18 and 19 are return springs 20 and 21 which are anchored on the base plate and are received in corresponding bores in the block. Thus, the block and the base plate are maintained in parallel planes.

Also anchored on base plate 17 is an anvil 22 having a rectangular cross section. Anvil 22 telescopes within an open ended anvil channel 23 having a rectangular cross section corresponding to that of the anvil.

Housed within block 16 is a feed roller 24 mounted on an axle 25 which extends through the block and terminates at either end in a ratchet wheel, only ratchet wheel 26 being shown in FIG. 1. A Velcro tape 27 providing the desired Velcro component (male or female) is drawn from a supply reel (not shown) and fed into a slot 28 in the front side of block 16. The tape is engaged by the ribbed surface of roller 24 and passes from the roller through the eye 29 of a cutting blade 30. Blade 30 defines a wall of anvil channel 23, and its eye cooperates with the adjacent edge of the moving anvil therein to effect a shearing action.

Associated with each ratchet wheel is a spring-biased pawl 31 which so engages the teeth of the wheel as to prevent counterclockwise rotation thereof. Thus, ratchet wheel 26 is only capable of rotating in the clockwise direction to advance tape 27. Also engaging the teeth of the ratchet wheels at either end of the roller axle are drive fingers 32 and 33. These are pivotally mounted within notches on opposite ends of base plate 17 and are spring-biased toward the teeth.

When spring-biased block 16 is depressed by horn 14, it then is shifted from its normally raised position above base plate 17 (represented in FIG. 1 by plane RP coextensive with the underface of block 16) to its final fully down position (represented in FIG. 1 by plane FP coextensive with the upper face of base plate 17). In the course of this downward movement, drive fingers 32 and 33 are disengaged from the teeth of their associated ratchet wheels. But when horn 14 retracts to permit spring-biased block 16 to go up from its final down position FP to its fully raised position RP, then the drive fingers engage the teeth to cause feed roller 24 to turn in the clockwise direction to advance Velcro tape 27.

A sheet of fabric 34 to which a Velcro tape component is to be welded at a desired site thereon is placed on the top face of block 16 with the site to be welded in registration with anvil channel 23. This fabric or sheet may be of any woven or non-woven type capable of being ultrasonically welded.

We shall now describe the successive operating phases of the unit.

Operating Phase I

Figure 4:
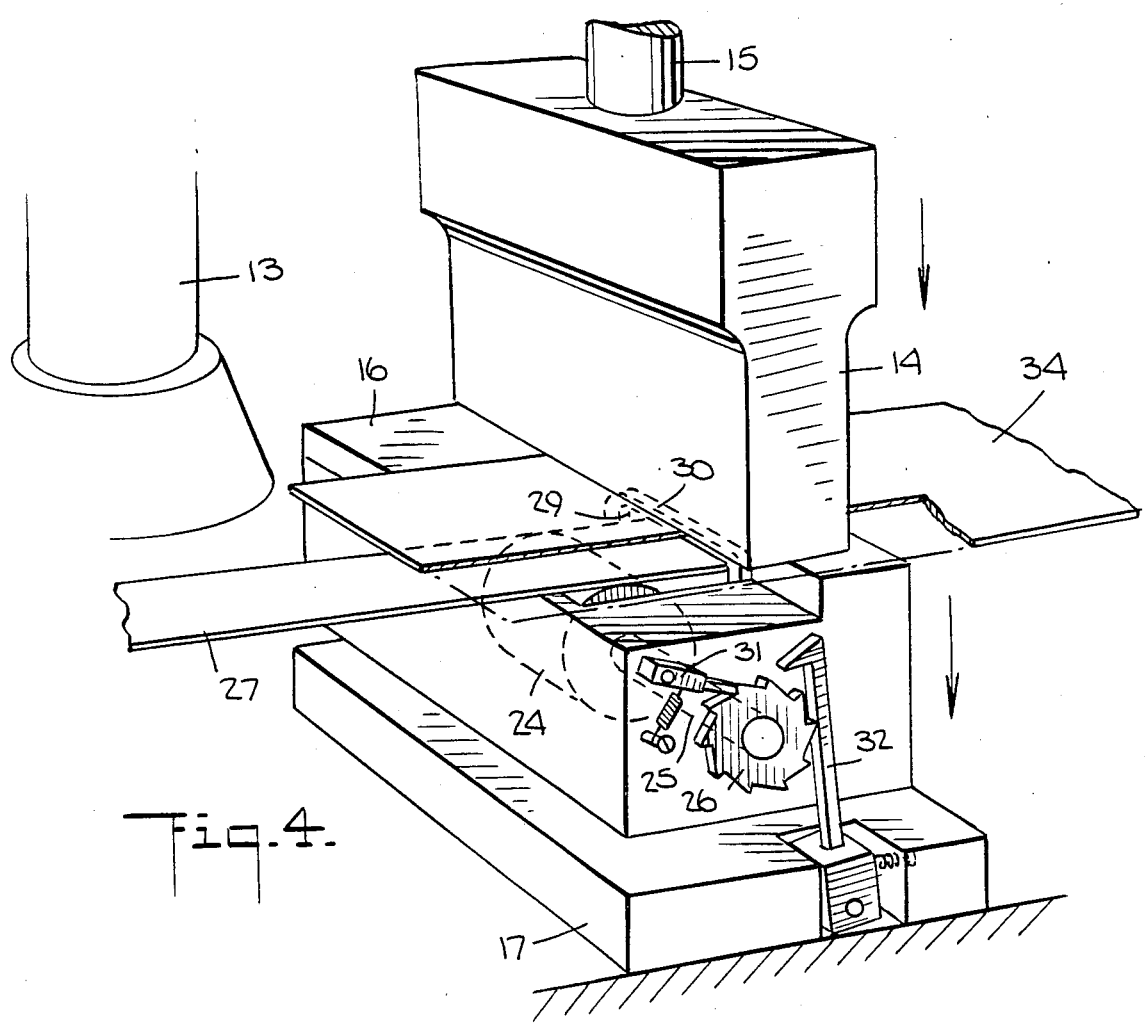
FIG. 4 shows a fabric placed on the top face of the block of the assembly with the welding machine horn depressing the block to a half-way down position.

As shown in FIGS. 4 and 5, when the operator actuates the ultrasonic welding machine, horn 14 then proceeds to move down to engage and depress block 16 of the assembly. In these figures, block 16 is shown at its halfway down position midway between the fully raised position RP and its final down position FP. In this halfway down position, the leading end 27L of tape 27 then lies within the anvil channel 23 on the head of anvil 22, the leading end having been brought into the channel as a result of a previous upward movement of the horn and the block.

At this point, the eye 29 of the blade is in registration with the head of the anvil, and as the block moves further down, the blade shears the tape, using the anvil head as the cutting edge, to yield a Velcro tape component.

Operating Phase II

When, as shown in FIG. 6, block 16 reaches its fully down position, the severed leading end 27L of the Velcro tape then lies on the head of anvil 22 under fabric 34. The fabric and the tape component are sandwiched between the anvil head and the ultrasonic horn and are subjected to ultrasonic energy to effect welding of the component to the fabric.

Operating Phase III

The fully extended horn 14 holds block 16 at its final down position FP for a brief period until the welding operation is completed, and it then proceeds, as shown in FIGS. 7 and 8, to retract. As a result of this retraction, spring-biased block 16 of the assembly then proceeds to move upwardly toward its raised position RP. In the course of this upward movement, ratchet wheel 26 is turned by drive finger 32 in the clockwise direction to cause feed roller 26 to advance a fresh leading end 27L of tape 27 into anvil channel 23 in readiness for the next operating cycle of the ultrasonic welding machine.

When horn 14 is fully retracted, as shown in FIG. 9, and block 16 is back to its fully raised position, one can then remove fabric 34 from the block. As shown separately in FIG. 10, fabric 34 now has a Velcro component 27L welded thereon. One can now put another fabric on the block and repeat the operating cycle to weld a Velcro component thereto.

Modifications

Instead of using a ratchet mechanism as shown in the figures to cause turning of the feed roller to advance the Velcro tape into the anvil channel only when the block moves upwardly from its final down position to its fully raised position, one can use a rack and pinion arrangement for the same purpose. In this modification, the pinion is mounted on the axle of the roller and engages a spring-biased rack pivotally mounted on the base plate. Or a cam arrangement may be used responsive to the movement of the block relative to the base plate to turn the feed roller, as required.

Because in practice the thickness of the fabric and the thickness of the Velcro tape to be welded thereto depend on the nature of the garment and may differ from job to job, in order to effectively compress the fabric and the tape piece between the ultrasonic energy horn and the head of the anvil, shims of different thickness may be used on the head of the anvil to provide the appropriate separation between the anvil head and the horn.

Also, while there has been shown a unit for use with a single Velcro tape, in practice the unit may be designed to accommodate two or more tapes, in which case an anvil channel and an anvil are provided for each of the tapes, as well as a cutting blade and a feed roller therefor.

While there has been shown and described a preferred embodiment of an automated velcro feed and cut assembly for ultrasonic welding applications in accordance with the invention, it will be appreciated that many changes and modifications may be made therein without, however, departing from the essential spirit thereof.

I claim:

1. A Velcro tape feed and cut assembly functioning as a slave unit that cooperates with a standard ultrasonic welding machine provided with a horn which is brought down to carry out a welding operation and then retracted in the course of a machine cycle, the assembly comprising:
   A a block spring-mounted above a stationary base plate and depressible by the downwardly-moving horn from a raised position above the plate and parallel thereto to a final down position adjacent the plate;
   B a feed roller housed in the block and rotatable therein, said roller when rotated in the clockwise direction acting to advance a Velcro tape;
   C an open-ended anvil channel formed in the block in the path of tape advance to receive the leading end of the tape;
   D a cutting blade adjoining the channel, said channel extending between the upper and lower faces of the block;
   E an anvil anchored on said base plate and projecting into said channel whereby when the block is partially depressed by the horn, the head of the anvil lies against the blade to provide a cutting edge therefor; and as the block is further depressed, the leading end of the tape which lies within the channel is severed, the severed end forming a Velcro component which is brought by the head into contact with the underside of a fabric lying on the upper face of the block, the Velcro component and the fabric being sandwiched between the anvil head and the horn to effect a welding action; and
   F means responsive to upward movement of the block while the horn is being retracted to rotate said roller clockwise to advance the leading end of the tape into the channel.

2. An assembly as set forth in claim 1, wherein said means is constituted by a ratchet wheel mounted on an axle supporting the roller, and a drive finger pivotally mounted on the base plate engaging the teeth of the wheel.

3. An assembly as set forth in claim 2, further including spring means to bias the drive finger toward said teeth.

4. An assembly as set forth in claim 2, further including a pawl engaging said teeth to prevent counterclockwise rotation of the wheel.

5. An assembly as set forth in claim 1, further including guide posts anchored on the base plate and received in bores in said block to maintain said block and said plate in parallel relation in the course of block movement.

6. An assembly as set forth in claim 5, further including helical springs anchored on the base plate and received in bores in said block.

7. An assembly as set forth in claim 1, wherein said blade has an eye through which said tape passes into the channel.

* * * * *